United States Patent
Komiya (10) Patent No.: US 8,505,272 B1
(45) Date of Patent: Aug. 13, 2013

(54) CABLE PROTECTION AND GUIDE DEVICE

(71) Applicant: Tsubakimoto Chain Co., Osaka (JP)

(72) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 13/768,298

(22) Filed: Feb. 15, 2013

(30) Foreign Application Priority Data

Feb. 27, 2012 (JP) .................................. 2012-040566

(51) Int. Cl.
*F16G 13/16* (2006.01)
*F16G 3/04* (2006.01)

(52) U.S. Cl.
USPC ................... 59/78.1; 59/900; 248/49; 248/51

(58) Field of Classification Search
USPC ............................... 59/78.1, 900; 248/49, 51
See application file for complete search history.

(56) References Cited

U.S. PATENT DOCUMENTS

| 7,305,815 B2* | 12/2007 | Utaki et al. ................ 59/78.1 |
| 7,317,160 B2* | 1/2008 | Utaki ........................ 59/78.1 |
| 7,392,650 B2* | 7/2008 | Utaki et al. ................ 59/78.1 |
| 7,406,819 B2* | 8/2008 | Utaki et al. ................ 59/78.1 |
| 7,428,808 B2* | 9/2008 | Utaki et al. ................ 59/78.1 |
| 7,513,096 B2* | 4/2009 | Utaki et al. ................ 59/78.1 |
| 2007/0218829 A1 | 9/2007 | Utaki et al. |
| 2007/0241239 A1 | 10/2007 | Utaki et al. |

FOREIGN PATENT DOCUMENTS

| JP | 2007247716 | 9/2007 |
| JP | 2007285376 | 11/2007 |

* cited by examiner

*Primary Examiner* — David B Jones
(74) *Attorney, Agent, or Firm* — Woodling, Krost and Rust (57) ABSTRACT

A device capable of correcting the relatively twisted positional relationship of mutually adjacent link frame bodies, and precisely place the link frame bodies at appropriate positions. A link side plate includes a rear side plate portion having first and second linear position holding surfaces respectively at rear and front sides thereof in a longitudinal direction. The first linear position holding surface has a convex shape formed with two faces whose attitudes are mutually different with respect to a lateral direction. The second linear position holding surface has a concave shape formed with two faces whose attitudes are mutually different with respect to the lateral direction.

5 Claims, 8 Drawing Sheets

CABLE PROTECTION AND GUIDE DEVICE

CROSS REFERENCE TO RELATED APPLICATIONS

The disclosure of Japanese Patent Application No. 2012-040566 filed on Feb. 27, 2012, and on which this application claims priority, is herein incorporated by reference in its entirety.

FIELD OF THE INVENTION

The present invention relates to a cable protection and guide device which securely protects and guides a flexible cable, such as an electric cable for transmitting electric signals or supplying electricity or a hose for supplying oil or air pressure, that connects a movable portion and a fixed portion of an industrial machine or a vehicle.

BACKGROUND ART

In the prior art, there is known a cable protection and guide device including a number of link frame bodies connected to each other in a longitudinal direction of a cable (referred to as "a cable longitudinal direction" hereinafter). Each of the link frame bodies has a pair of link side plates provided so as to be spaced from each other in a lateral direction, and connecting arms bridging over outer and inner sides of the pair of link side plates connected flexibly in the cable longitudinal direction (referred to as "cable flexional outer and inner circumferential sides of the pair of link side plates" hereinafter). The device accommodates and guides a cable in the interior of the link frame bodies from one to the other of a cable fixed end and a cable movable end, and is capable of taking a linear position in which the device is in contact with a support surface of a support, and a flexional position in which the device is spaced from the support surface as disclosed in Japanese Patent Application Laid-Open Nos. 2007-247716 and 2007-285376 for example.

Figure 8:
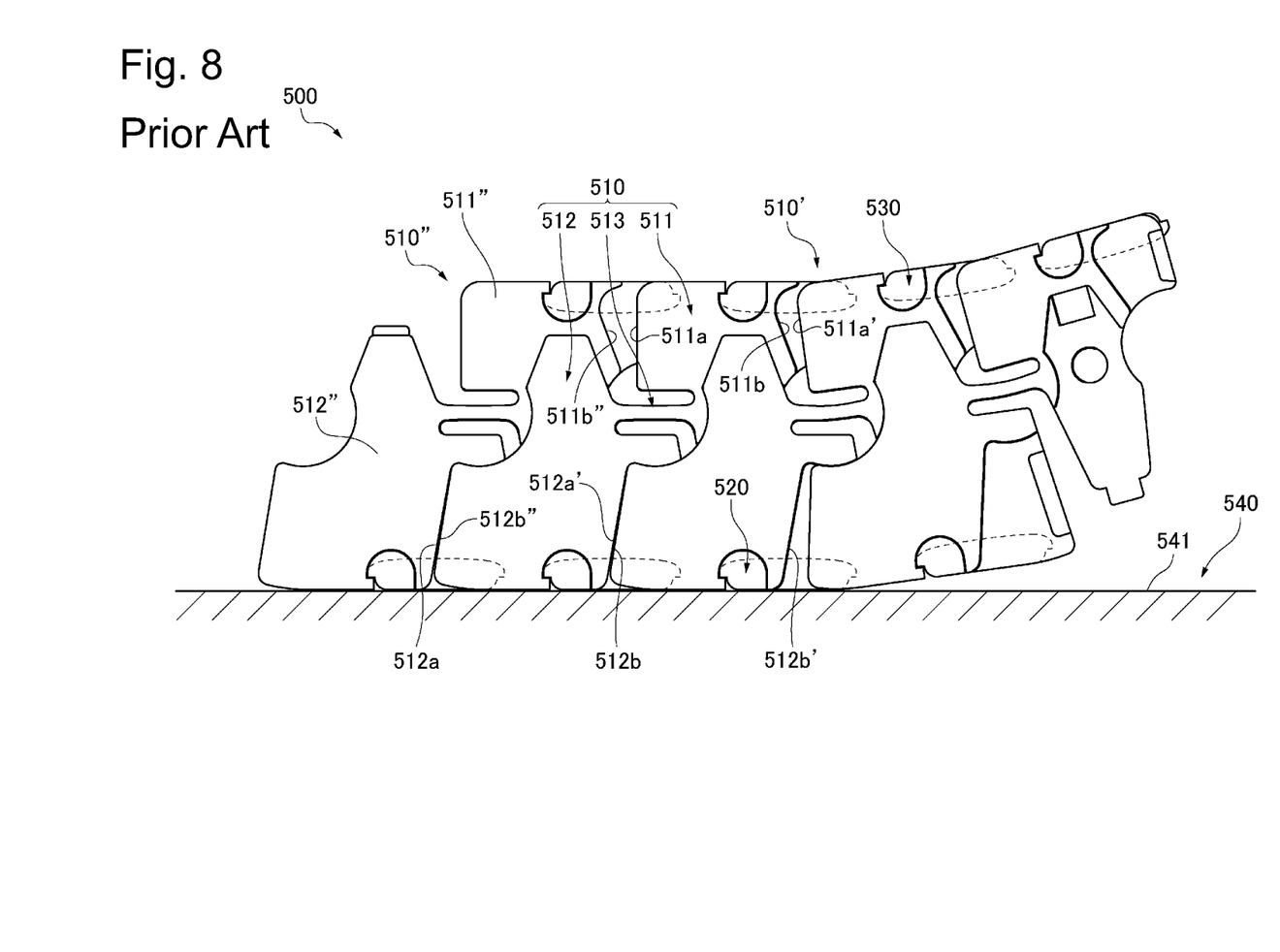
FIG. 8 is a diagram showing link side plates of a cable protection and guide device of prior art.

FIG. 8 shows a cable protection and guide device 500 as one example of such conventional cable protection and guide device.

Specifically, FIG. 8 is a diagram showing link side plates 510 of the conventional cable protection and guide device 500.

Each of the link frame bodies of the conventional cable protection and guide device 500 includes a pair link side plates 510 (only one side of them is shown) provided so as to be spaced from each other in a lateral direction, a first connecting arm 520 bridging over a cable flexional outer circumferential side of the pair of link side plates 510, and a second connecting arm 530 bridging over a cable flexional inner circumferential side of the pair of link side plates 510.

The link side plate 510 is integrally composed of a front side plate portion 511 connected to a preceding link side plate 510' in the cable longitudinal direction to form the cable flexional inner circumferential side, a rear side plate portion 512 connected to a succeeding link side plate 510" in the cable longitudinal direction to form the cable flexional outer circumferential side, and a linkage portion 513 being flexible and interposed between the front side plate portion 511 and the rear side plate portion 512.

The cable protection and guide device 500 is configured to be capable of taking a linear position in which the device 500 is in contact with a support surface 541 of a support 540, and a flexional position in which the device 500 is separated from the support surface 541.

The rear side plate portion 512 includes a first linear position holding surface 512a and a second linear position holding surface 512b respectively provided at rear and front sides thereof in the cable longitudinal direction.

When the device 500 is in the linear position, the first linear position holding surface 512a of the rear side plate portion 512 of the link side plate 510 is in surface contact with a second linear position holding surface 512b" of a rear side plate portion 512" of the succeeding link plate 510".

The front side plate portion 511 includes a first flexional position restricting surface 511a and a second flexional position restricting surface 511b respectively provided at rear and front sides thereof in the cable longitudinal direction.

When the device 500 is in the flexional position, the first flexional position restricting surface 511a of the front side plate portion 511 of the link side plate 510 is in surface contact with a second flexional position restricting surface 511b" of a front side plate portion 511" of the succeeding link plate 510".

SUMMARY OF THE INVENTION

Unfortunately, because the first linear position holding surface 512a and the second linear position holding surface 512b", which are in contact with each other under the linear position, respectively have a planar structure composed of one face. The aforementioned conventional cable protection and guide device 500 has a problem that mutually adjacent link frame bodies may be twisted with respect to each other by external force when the device 500 moves to the linear position, a problem that the link frame bodies may be twisted with respect to each other by external force when the device 500 is in the linear position, a problem that the strength (or durability) of the link side plate against crush forces is not sufficient since a load that acts on contacting portions does not disperse when the device 500 moves to the linear position, and a problem that a large amount of abrasion and loud impact noise occurs when the device 500 moves to the linear position.

Accordingly, in order to address the above-mentioned problems of the prior art, there is a need for a cable protection and guide device that is capable of correcting relatively twisted positional relationship of mutually adjacent link frame bodies and precisely place the link frame bodies at appropriate positions, of increasing the integrity of link frame bodies of the device in the linear position to prevent twisting of the link frame bodies, of increasing the strength (durability) of the link side plate against crush forces, and of reducing abrasion (wear) of the first and second linear position holding surfaces while mitigating impact noise.

In order to address the above-mentioned problems, according to a first aspect of the present invention, there is provided a cable protection and guide device. The cable protection and guide device includes a number of link frame bodies connected to each other in a cable longitudinal direction. Each of the link frame bodies having a pair of link side plates provided so as to be spaced from each other in a lateral direction. Connecting arms bridge over cable flexional outer and inner circumferential sides of the pair of link side plates. The device accommodates and guides a cable in the interior of the link frame bodies from one to the other of a cable fixed end and a cable movable end. The device is capable of taking a linear position in which the device is in contact with a support surface of a support, and a flexional position in which the device is separated from the support surface. Each of the pair of link side plates is integrally composed of a front side plate portion which is connected to a preceding link side plate in the cable longitudinal direction to form the cable flexional inner circumferential side. Each of the pair of link side plates includes a rear side plate portion connected to a succeeding link side plate in the cable longitudinal direction to form the cable flexional outer circumferential side. Each of the pair of link side plates includes a linkage portion being flexible and interposed between the front side plate portion and the rear side plate portion. The rear side plate portion includes a first linear position holding surface and a second linear position holding surface respectively provided at rear and front sides thereof in the cable longitudinal direction. The first linear position holding surface has two faces whose attitudes are mutually different when viewed from the lateral direction to form one of convex and concave shapes. The second linear position holding surface has two faces whose attitudes are mutually different when viewed from the lateral direction to form the other of the convex and concave shapes. The first linear position holding surface of the rear side plate portion of one link side plate is in surface contact with the second linear position holding surface of the rear side plate portion of the succeeding link plate when the device is in the linear position.

According to a second aspect of the present invention, the front side plate portion includes a first flexional position restricting surface and a second flexional position restricting surface respectively provided at rear and front sides thereof in the cable longitudinal direction. The first flexional position restricting surface has two faces whose attitudes are mutually different with respect to the lateral direction to form one of convex and concave shapes. The second flexional position restricting surface has two faces whose attitudes are mutually different with respect to the lateral direction to form the other of the convex and concave shapes. The first flexional position restricting surface of the front side plate portion of one link side plate being in surface contact with the second flexional position restricting surface of the front side plate portion of the succeeding link plate at each of the two faces when the device is in the flexional position.

According to a third aspect of the present invention, an angle between the two faces of the first flexional position restricting surface and between the two faces of the second flexional position restricting surface is smaller than an angle between the two faces of the first linear position holding surface and between the two faces of the second linear position holding surface.

According to a fourth aspect of the present invention, the convex and concave shapes formed with the respective two faces of the first flexional position restricting surface and the second flexional position restricting surface are provided in a circumferential direction with respect to a virtual center axis of the device in the flexional position.

According to a fifth aspect of the present invention, the linkage portion includes a central flexible area in a thin plate shape extending in the cable longitudinal direction, and base end continuous areas extending from the central flexible area to the front side plate portion and the rear side plate portion, respectively. The thickness of the thin plate shape gradually increases, and the rear side plate portion includes a third flexional position restricting surface and a fourth flexional position restricting surface respectively provided at the rear and front side thereof in the cable longitudinal direction. Each of the third flexional position restricting surface and the fourth flexional position restricting surface having a face which is in parallel with the lateral direction. The third flexional position restricting surface of the rear side plate portion of one link side plate being in surface contact with the fourth flexional position restricting surface of the rear side plate portion of the succeeding link side plate when the device is in the flexional position.

According to the cable protection and guide device of the present invention, which includes the number of link frame bodies connected to each other in the cable longitudinal direction, each link frame body has a pair of link side plates provided so as to be spaced from each other in the lateral direction. The connecting arms bridge over cable flexional outer and inner circumferential sides of the pair of link side plates. A cable is guided in the interior of the link frame bodies from the cable fixed end to the cable movable end. The device may take a linear position, in which the device is in contact with a support surface of a support, and a flexional position, in which the device is spaced from the support surface. In addition, the cable protection and guide device of the present invention has the following unique effects.

The unique effects of the first aspect of the present invention include:

a pair of link side plates, each of the link plates is integrally composed of:

the front side plate portion connected to a preceding link side plate in the cable longitudinal direction to form the cable flexional inner circumferential side;

the rear side plate portion connected to a succeeding link side plate in the cable longitudinal direction to form the cable flexional outer circumferential side; and, the linkage portion being flexible and interposed between the front side plate portion and the rear side plate portion.

The rear side plate portion includes the first linear position holding surface and the second linear position holding surface respectively provided at the rear and front sides thereof in the cable longitudinal direction. The first linear position holding surface has two faces whose attitudes are mutually different when viewed from the lateral direction to form one of convex and concave shapes. The second linear position holding surface has two faces whose attitudes are mutually different when viewed from the lateral direction to form the other of the convex and concave shapes. The first linear position holding surface of the rear side plate portion of one link side plate is in surface contact with the second linear position holding surface of the rear side plate portion of the succeeding link plate at each of the two faces when the device is in the linear position. When the device moves from the flexional position to the linear position and one link frame body and another adjacent link frame body are slightly twisted with respect to each other by external force, one of the two faces of the first linear position holding surface and a corresponding one of the two faces of the second linear position holding surface come in contact with each other obliquely with respect to a perpendicular direction thereof. This surface to surface contact guides the link frame bodies toward a direction in which a top edge of the convex shape and a bottom edge of the concave shape are eventually aligned with each other. The relatively twisted positional relationship of the mutually adjacent link frame bodies is thus corrected and the link frame bodies are appropriately positioned.

During this process, because the two faces come into sequential contact with the corresponding two faces, the impact forces are dispersed which mitigates impact noise.

In the linear position, the convex shape formed with two faces, and the concave shape formed with two faces, are in close contact with each other to generate the so-called wedge effect. The wedge effect increases the integrity of link frame bodies of the device in the linear position to prevent twisting of the link frame bodies.

Also, because when the device moves from the flexional position to the linear position a load that acts on contact portions is dispersed into two faces that are in mutually different positions as a normal force, it is possible to decrease the deformation of the link side plate and increase the strength (durability) of the link side plate against crushing.

Furthermore, because when the device moves from the flexional position to the linear position, at least one of the two faces comes in contact with a corresponding one of the two faces obliquely with respect to a circumferential direction of a virtual central axis of the flexion of the device to mitigate impact force. Therefore, abrasion (wear) of the first linear position holding surface and the second linear position holding surface is reduced by using two surfaces. Using two surfaces compared to a surface structure having only one surface also lessens impact noise.

According to the cable protection and guide device of a second aspect of the present invention, in which the front side plate portion includes the first flexional position restricting surface and the second flexional position restricting surface respectively provided at rear and front sides thereof in the cable longitudinal direction, the first flexional position restricting surface having the two faces whose attitudes are mutually different with respect to the lateral direction to form one of convex and concave shapes, the second flexional position restricting surface having the two faces whose attitudes are mutually different with respect to the lateral direction to form the other of the convex and concave shapes, the first flexional position restricting surface of the front side plate portion of one link side plate being in surface contact with the second flexional position restricting surface of the front side plate portion of the succeeding link plate at each of the two faces when the device is in the flexional position, because when the device moves from the linear position to the flexional position and one link frame body and another adjacent link frame body are slightly twisted with respect to each other by external force, one of the two faces of the first flexional position restricting surface and corresponding one of the two faces of the second flexional position restricting surface come in contact with each other obliquely with respect to a perpendicular direction thereof and guide the link frame bodies toward the direction in which a top edge of the convex shape and a bottom edge of the concave shape are eventually aligned with each other, it is possible to correct the relatively twisted positional relationship of the mutually adjacent link frame bodies and precisely place the link frame bodies at appropriate positions.

During this process, because the two faces come in contact with the corresponding two faces one after another to disperse a timing at which impact force occurs, it is possible to mitigate impact noise.

Also, because under the flexional position the convex shape formed with two faces and the concave shape formed with two faces are in close contact with each other to generate so-called wedge effect, it is possible to increase the integrity of link frame bodies of the device in the flexional position to prevent twisting of the link frame bodies.

Also, because when the device moves from the linear position to the flexional position a load that acts on contact portions is dispersed into two faces that are in mutually different positions as normal force, it is possible to decrease the deformation of the link side plate and increase the strength (durability) of the link side plate against crash.

Furthermore, because when the device moves from the linear position to the flexional position at least one of the two faces comes in contact with corresponding one of two faces obliquely with respect to a circumferential direction of the virtual central axis of the flexion of the device to mitigate impact force, it is possible to reduce abrasion (wear) of the first flexional position restricting surface and the second flexional position restricting surface in comparison with a surface structure having only one surface and to mitigate impact noise.

According to the cable protection and guide device of a third aspect of the present invention, in which the angle between the two faces of the first flexional position restricting surface and between the two faces of the second flexional position restricting surface is smaller than the angle between the two faces of the first linear position holding surface and between the two faces of the second linear position holding surface, because the guide effect that is created when the device moves to the flexional position to guide the link frame bodies toward a direction in which the top edge of the convex shape and the bottom edge of the concave shape are eventually aligned with each other and the wedge effect that is created when the device is in the flexional position are both increased, it is possible to enhance the accuracy of the positional relationship between the link frame bodies and increase the integrity of the link frame bodies to prevent twisting of the link frame bodies particularly in the flexional position.

Also, because the respective two faces of the first and second linear position holding surfaces at the flexional outer circumferential side come in contact with each other in a slightly inclined direction with respect to a perpendicular line of each face to make it easier to accurately define relative positions of the link frame bodies of the device in the linear position, it is possible to enhance the accuracy of the linear position.

According to the cable protection and guide device of a fourth aspect of the present invention, in which the convex and concave shapes formed with the respective two faces of the first flexional position restricting surface and the second flexional position restricting surface are provided in a circumferential direction with respect to a virtual center axis of the device in the flexional position, because the guide effect of guiding the link frame bodies toward a direction in which the top edge of the convex shape and the bottom edge of the concave shape are eventually aligned with each other occurs more reliably when the device moves to the flexional position, it is possible to increase the accuracy of the positional relationship of link frame bodies in the flexional position to reliably prevent twisting of the link frame bodies.

Also, because the wedge effect occurs more reliably when the device is in the flexional position, it is possible to increase the integrity of link frame bodies in the flexional position to reliably prevent twisting of the link frame bodies.

According to the cable protection and guide device of a fifth aspect of the present invention, in which the linkage portion includes the central flexible area in a thin plate shape extending in the cable longitudinal direction, and the base end continuous areas extending from the central flexible area to the front side plate portion and the rear side plate portion, respectively, so that the thickness of the thin plate shape gradually increases, and the rear side plate portion includes the third flexional position restricting surface and the fourth flexional position restricting surface respectively provided at the rear and front side thereof in the cable longitudinal direction, each of the third flexional position restricting surface and the fourth flexional position restricting surface having a face which is in parallel with the lateral direction, the third flexional position restricting surface of the rear side plate portion of one link side plate being in surface contact with the fourth flexional position restricting surface of the rear side plate portion of the succeeding link side plate when the device is in the flexional position, because the flexional position is restricted at both the flectional inner circumferential side and the flexional outer circumferential side, it is possible to accurately define the flexional position by using the linkage portion which does not have a rotating shaft or a hinge structure.

Also, because when the device moves from the linear position to the flexional position a load is also dispersed into contact portions of the third and fourth flexional position restricting surfaces at the flexional outer circumferential side, it is possible to reduce the load acting on a plate structure of the linkage portion.

DETAILED DESCRIPTION OF THE PREFERRED EMBODIMENT

The cable protection and guide device of the present invention is not particularly limited as long as the device includes a number of link frame bodies connected to each other in a cable longitudinal direction. The link frame body has a pair of link side plates provided so as to be spaced from each other in a lateral direction, and connecting arms bridging over cable flexional outer and inner circumferential sides of the pair of link side plates. The device accommodates and guides a cable in the interior of the link frame bodies from a cable fixed end and a cable movable end. The device is capable of taking a linear position in which the device is in contact with a support surface of a support. The device is capable of taking a flexional position in which the device is separated from the support surface. Each of the link side plates is integrally composed of a front side plate portion connected to a preceding link side plate in the cable longitudinal direction to form the cable flexional inner circumferential side. Each of the link side plates includes a rear side plate portion connected to a succeeding link side plate in the cable longitudinal direction to form the cable flexional outer circumferential side. Each of the link side plates includes a linkage portion being flexible and interposed between the front side plate portion and the rear side plate portion. The rear side plate portion includes a first linear position holding surface and a second linear position holding surface respectively provided at rear and front sides thereof in the cable longitudinal direction. The first linear position holding surface has two faces whose attitudes are mutually different when viewed from the lateral direction to form one of convex and concave shapes. The second linear position holding surface has two faces whose attitudes are mutually different when viewed from the lateral direction to form the other of the convex and concave shapes. The first linear position holding surface of the rear side plate portion of one link side plate is in surface contact with the second linear position holding surface of the rear side plate portion of the succeeding link plate at each of the two faces when the device is in the linear position. Thus, it is possible to correct the relatively twisted positional relationship of the mutually adjacent link frame bodies and precisely place the link frame bodies at appropriate positions, to increase the integrity of link frame bodies of the device in the linear position to prevent twisting of the link frame bodies, to increase the strength (durability) of the link side plate against crush forces, and to reduce abrasion (wear) of the first linear position holding surface and the second linear position holding surface in comparison with a surface structure having only one surface while mitigating impact noise.

For example, in the embodiment described below the first linear position holding surface has a convex shape formed with two faces in mutually different positions and the second linear position holding surface has a concave shape formed with two faces in mutually different positions, the former may have a concave shape and the latter may have a convex shape.

The material of the link side plate used in the cable protection and guide device of the present invention may be synthetic resin such as engineering resin or metal such as aluminum. The shape of the link side plate is not particularly limited as long as the link side plate can constitute a part of the link frame body and can be connected to another link side plate in a cable longitudinal direction such that a cable inserted into the interior of the link frame bodies can be moved between a cable movable end and a cable fixed end by bending the cable back in the cable longitudinal direction.

Also, the cable may be any flexible linear object, such as an electric cable or a hose that is used in a machine for supplying electricity, transmitting signals, or conducting material such as fluid.

EMBODIMENTS

A cable protection and guide device 100 of one embodiment of the present invention will now be described on the basis of FIGS. 1 to 7.

Figure 1:
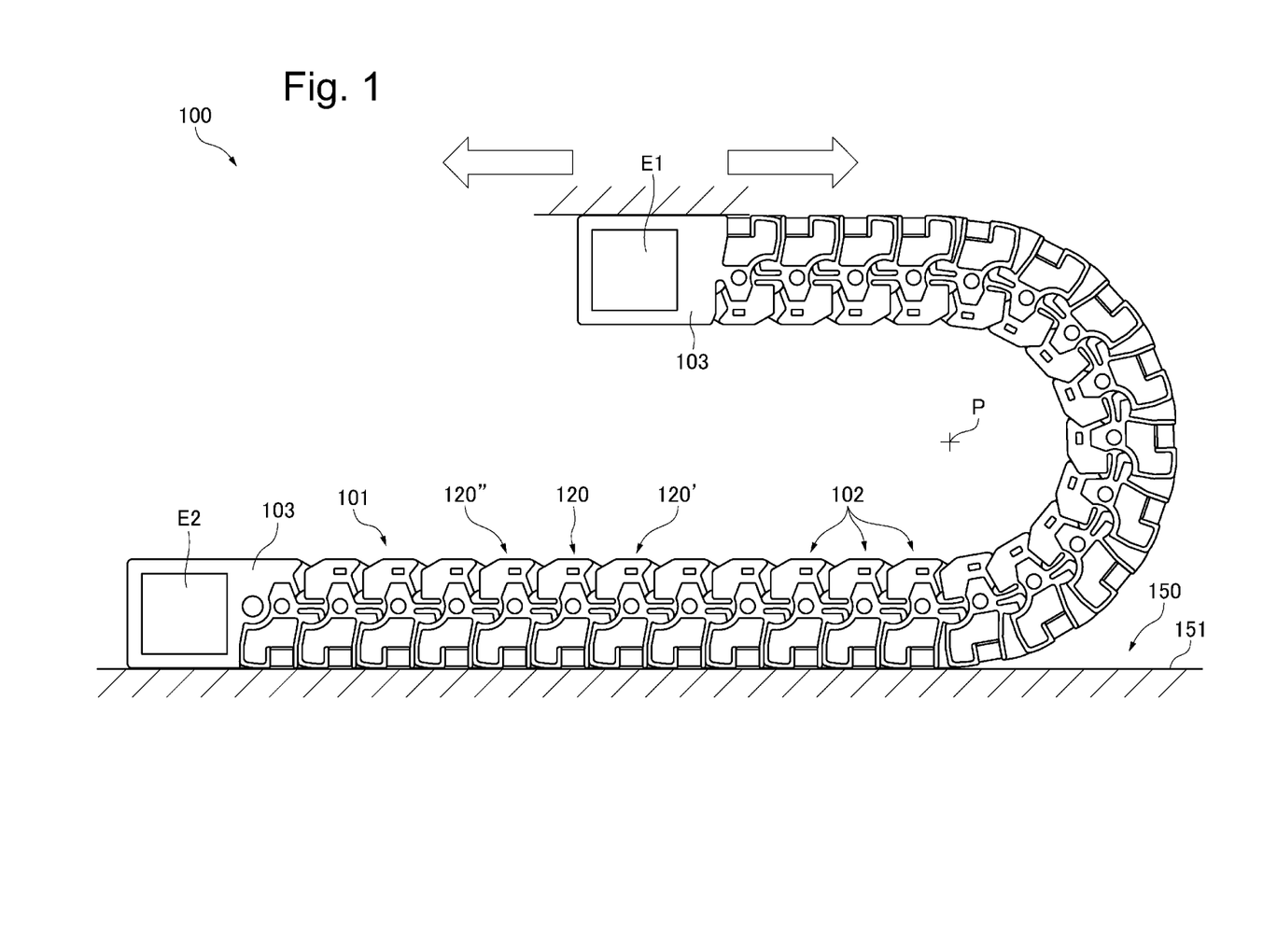
FIG. 1 is a schematic front view of a cable protection and guide device of one embodiment of the present invention.
Figure 2:
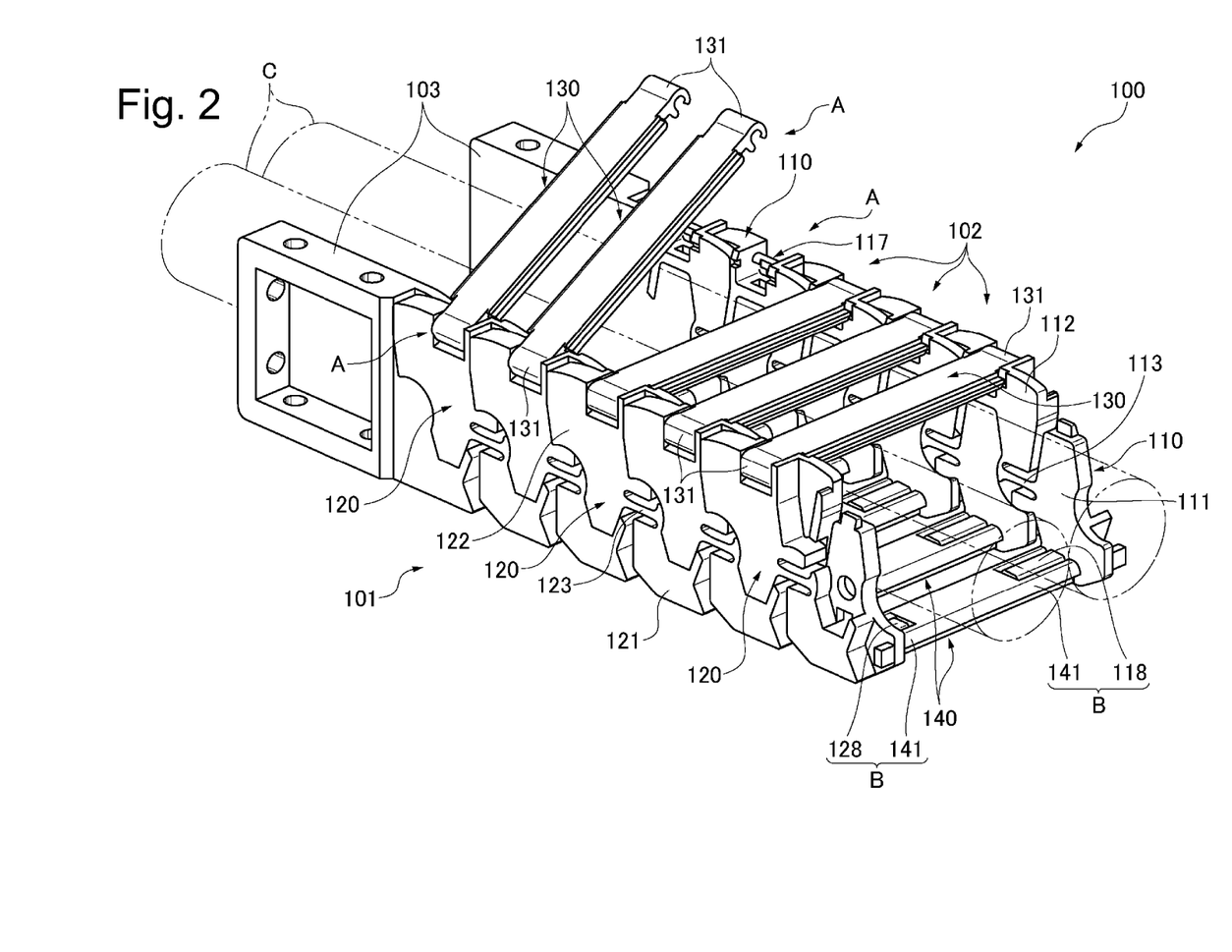
FIG. 2 is a perspective view of the cable protection and guide device of one embodiment of the present invention.
Figure 3:
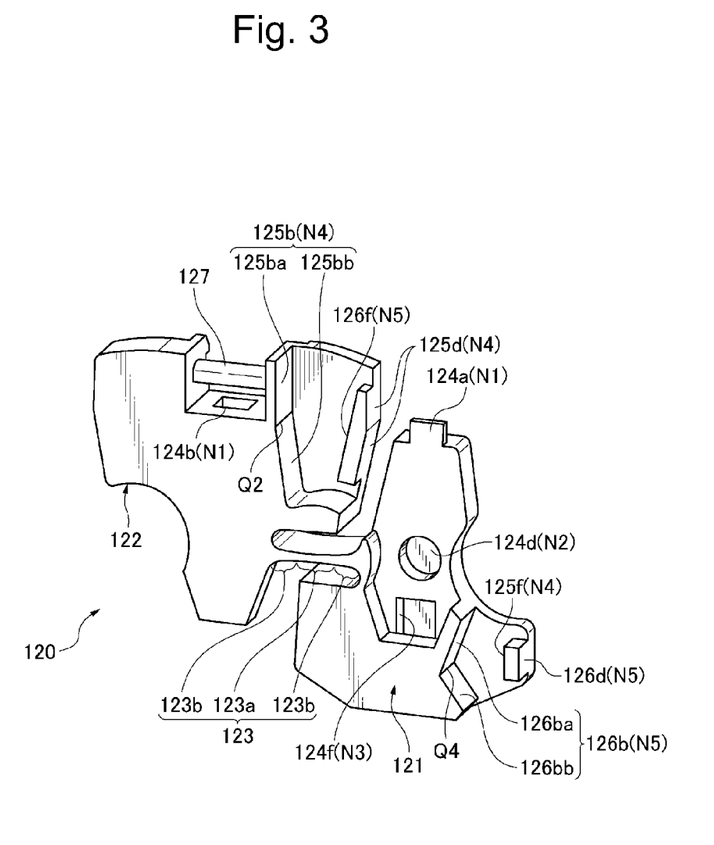
FIG. 3 is a perspective view of a second link side plate in one embodiment of the present invention viewed from an outer side.
Figure 4:
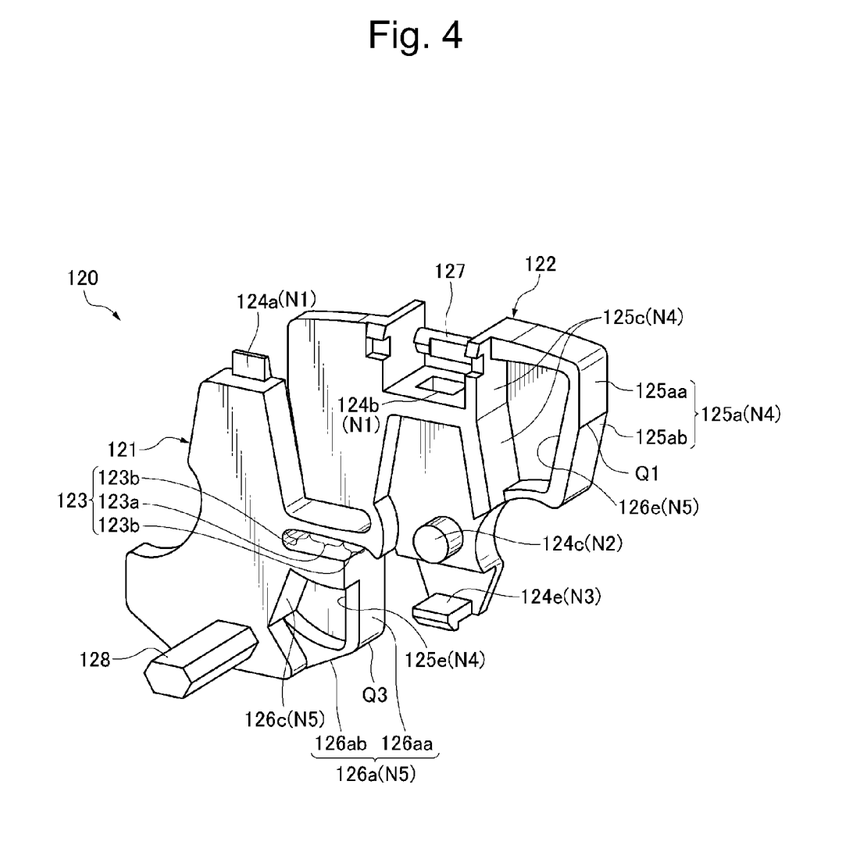
FIG. 4 is a perspective view of the second link side plate in one embodiment of the present invention viewed from an inner side.
Figure 5:
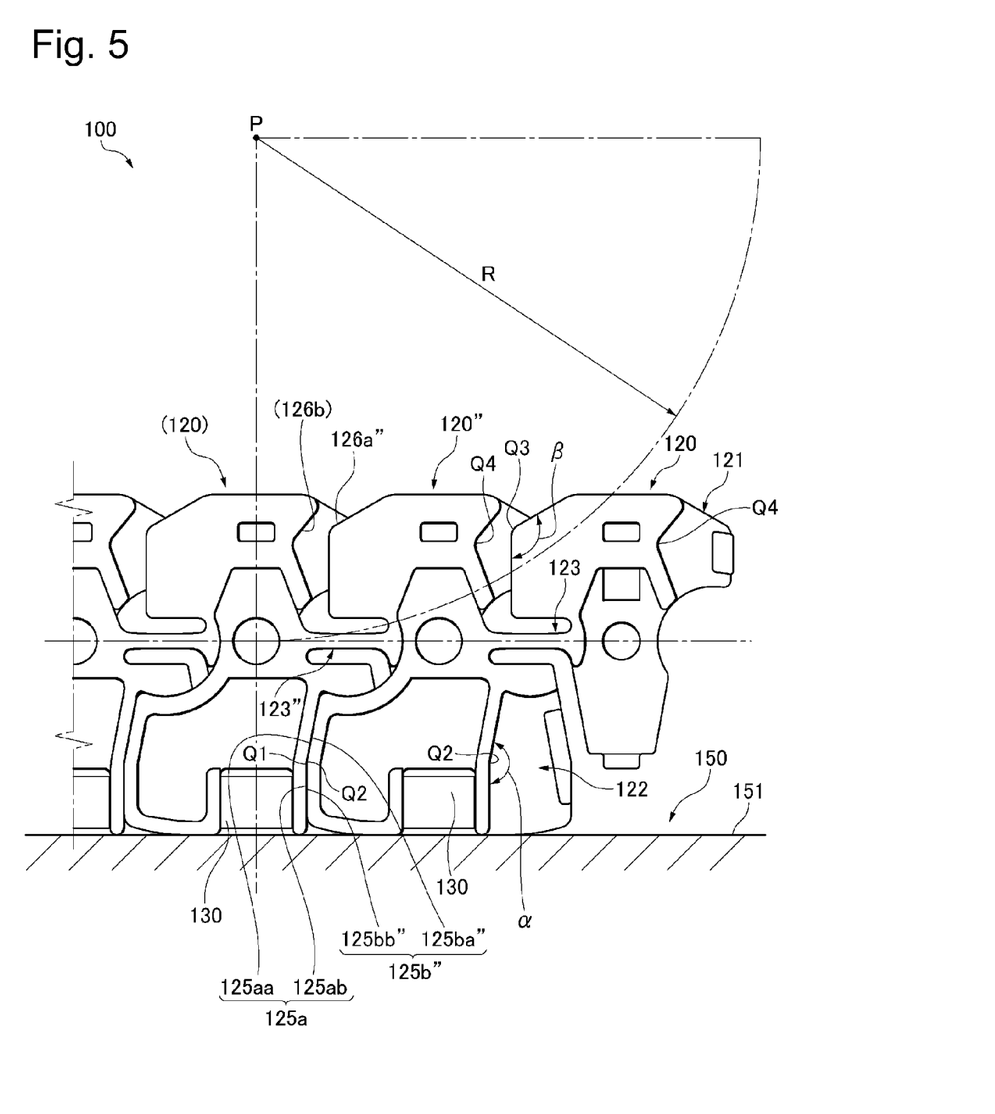
FIG. 5 is a diagram showing the cable protection and guide device of one embodiment of the present invention in a linear position.
Figure 6:
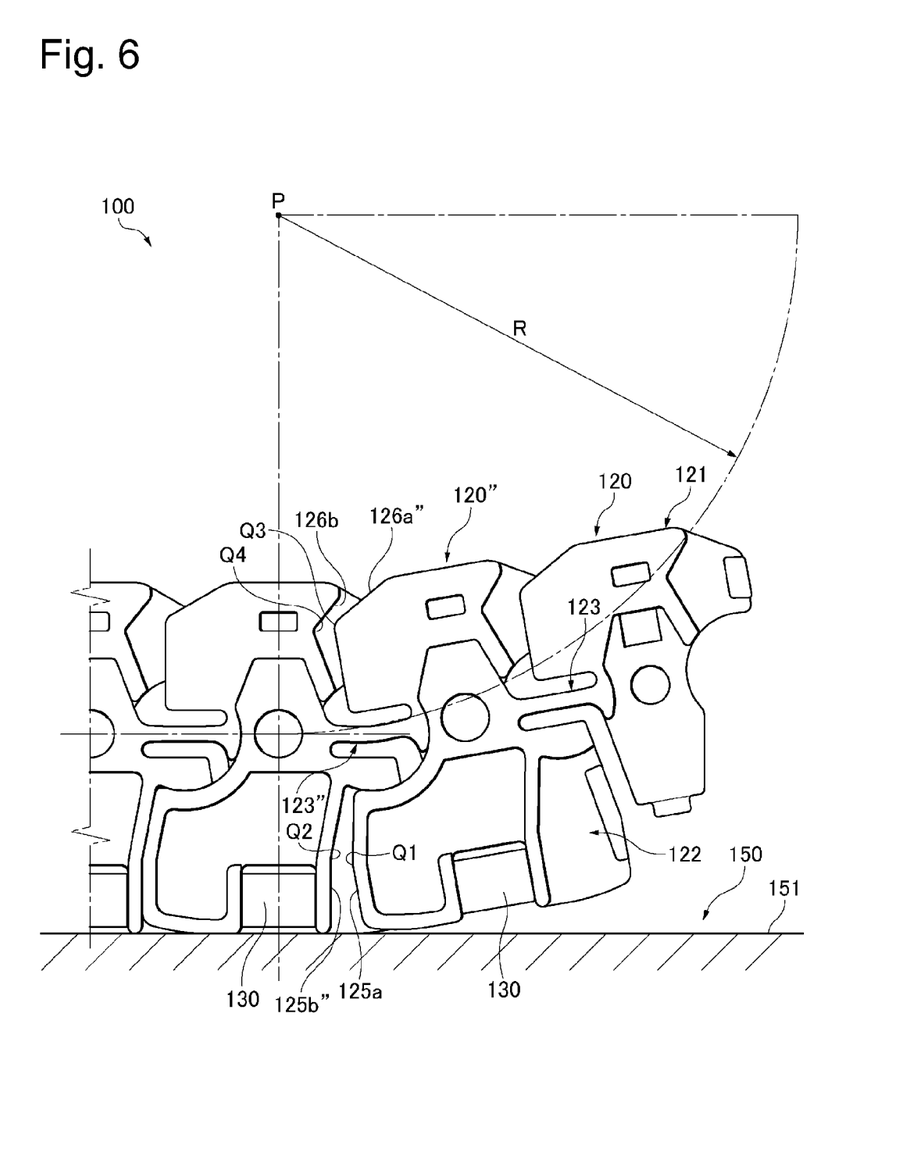
FIG. 6 is a diagram showing the cable protection and guide device of one embodiment of the present invention at the beginning of flexing.
Figure 7:
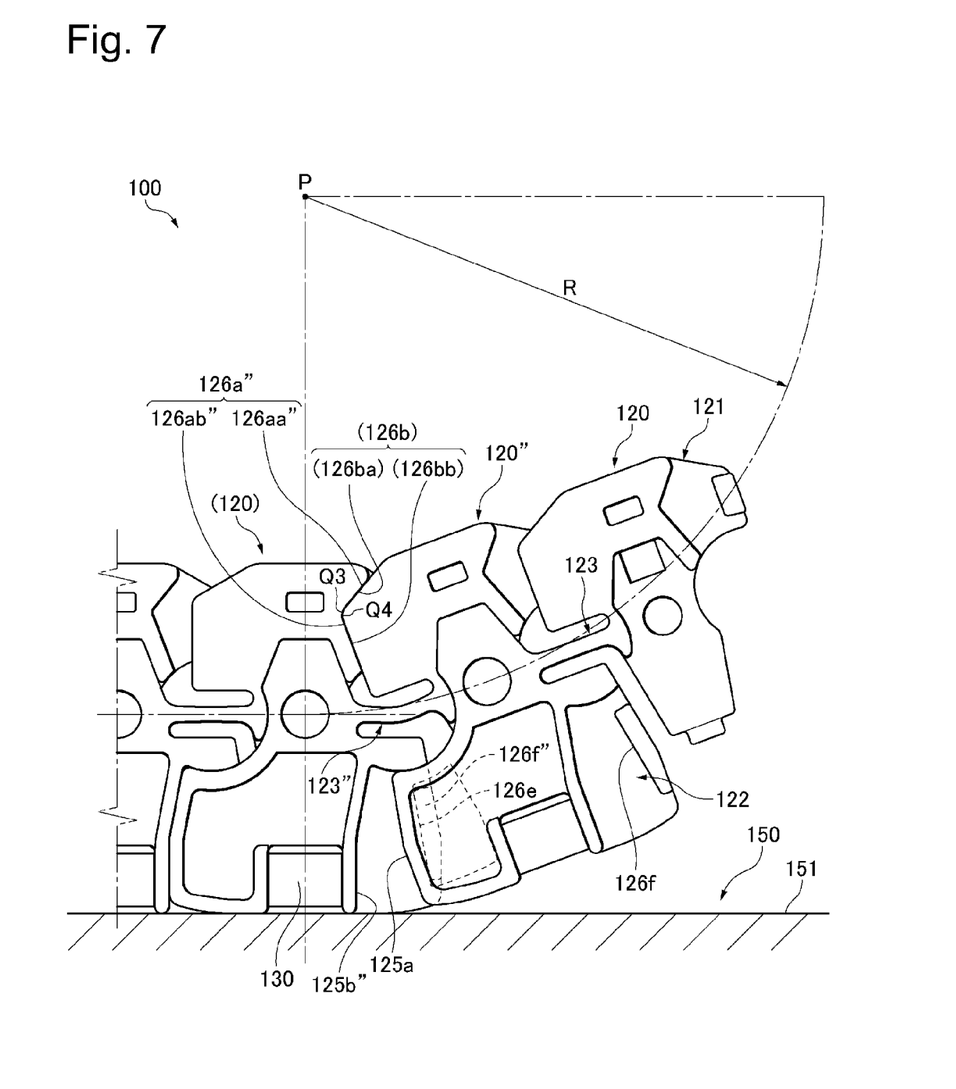
FIG. 7 is a diagram showing the cable protection and guide device of one embodiment of the present invention in a flexional position.

FIG. 1 is a schematic front view of the cable protection and guide device 100 of one embodiment of the present invention. FIG. 2 is a perspective view of the cable protection and guide device 100 of one embodiment of the present invention. FIG. 3 is a perspective view of a second link side plate 120 in one embodiment of the present invention viewed from an outer side. FIG. 4 is a perspective view of the second link side plate 120 in one embodiment of the present invention viewed from an inner side. FIG. 5 is a diagram showing the cable protection and guide device 100 of one embodiment of the present invention in a linear position. FIG. 6 is a diagram showing the cable protection and guide device 100 of one embodiment of the present invention at the beginning of flexing. FIG. 7 is a diagram showing the cable protection and guide device 100 of one embodiment of the present invention in a flexional position.

As shown in FIGS. 1 to 7, the cable protection and guide device 100 of one embodiment of the present invention is provided in a machine (not shown) that includes a cable C.

The machine may be semiconductor production equipment, pharmaceutical development and test equipment, a vehicle door opening and closing device, or a machine tool.

The cable protection and guide device 100 includes a number of link frame bodies connected to each other in a cable longitudinal direction. Each of the link frame bodies has a pair of side link plates, i.e., a first link side plate 110 and a second link side plate 120, provided so as to be spaced from each other in a lateral direction. Each of the link frame bodies has connecting arms, i.e., a first connecting arm 130 and a second connecting arm 140, respectively bridging over a cable flexional outer circumferential side and a cable flexional inner circumferential side of the first and second link side plates 110 and 120. The device 100 accommodates and guides the cable C at the interior of the link frame bodies from a cable fixed end E2 and a cable movable end E1. The device is capable of taking a linear position in which the device 100 is in contact with a support surface 151 of a support 150. The device is capable of taking a flexional position in which the device 100 is separated from the support surface 151.

Specifically, as shown in FIG. 1, the cable fixed end E2 of the cable protection and guide device 100 is connected to a stationary portion of the machine via a mounting portion 103. The cable movable end E1 of the cable protection and guide device 100 is connected to a movable portion of the machine via the mounting portion 103. The cable protection and guide device 100 is flexible so as to wholly or partially take a linear position or a flexional position in accordance with the movement of the cable C between the movable portion and the stationary portion.

As shown in FIG. 2, the cable protection and guide device 100 includes a link row group 101 composed of a plurality of link rows 102 aligned and flexibly connected to each other in the cable longitudinal direction, a plurality of the first connecting arms 130, and a plurality of the second connecting arms 140.

Each link row 102 is composed of a pair of the first and second link side plates 110 and 120 provided so as to be spaced from each other in a lateral direction.

The first connecting arm 130 connects a pair of the first and second link side plates 110 and 120 at a cable flexional outer circumferential side, and is detachably mounted to the pair of the first and second link side plates 110 and 120 with a mounting structure A.

The mounting structure A includes hinge shafts 117 and 127 respectively formed on a pair of the first and second link side plates 110 and 120, and hooks 131, 131 formed at both ends of the first connecting arm 130.

The second connecting arm 140 connects a pair of the first and second link side plates 110 and 120 at a cable flexional inner circumferential side, and is detachably mounted to the pair of the first and second link side plates 110 and 120 with a mounting structure B.

The mounting structure B includes engaging portions 118 and 128 respectively formed on a pair of the first and second link side plates 110 and 120, and arm engaging portions 141 and 141 formed on the second connecting arm 140.

The pair of the first and second link side plates 110 and 120 will now be described.

In the present embodiment, as shown in FIG. 3, the second link side plate 120 (the first link side plate 110) is integrally composed of a front side plate portion 121 (111) connected to a preceding second link side plate 120' (first link side plate 110') in the cable longitudinal direction to form the cable flexional inner circumferential side. A rear side plate portion 122 (112) is connected to a succeeding second link side plate 120" (first link side plate 110") to form the cable flexional outer circumferential side, and a linkage portion 123 (113) which is flexible and interposed between the front side plate portion 121 (111) and the rear side plate portion 122 (112).

Because the first and second link side plates 110 and 120 are bilaterally symmetrical with respect to an axis in the cable longitudinal direction, only the second link side plate 120 will be described with reference to FIGS. 3 and 4 to avoid duplicate description of the first link side plate 110.

Also, for the purpose of simplicity in this description, a preceding second link side plate of the second link side plate 120 (that is, a second link side plate connected to the second link side plate 120 at a front side of the second link side plate 120 in the cable longitudinal direction) will be identified as 120', while a succeeding second link side plate of the second link side plate 120 (that is, a second link side plate connected to the second link side plate 120 at a rear side of the second link side plate 120 in the cable longitudinal direction) will be identified as 120".

Similarly, a single quotation mark "'" and a double quotation mark "''" will be used for reference numerals that identify elements of the preceding second link side plate 120' and the succeeding second link side plate 120", respectively. Also, specific illustration will be avoided for elements of the preceding second link side plate 120' and the succeeding link side plate 120" when positions and shapes of the elements can be perceived from the illustration of corresponding elements of the second link side plate 120.

The second link side plate 120 includes first to third connecting structures N1 to N3 for connecting to the second link side plate 120' which is adjacent thereto in the cable longitudinal direction.

The first connecting structure N1 includes a first fitting convex portion 124a provided on the front side plate portion 121 and a first fitting concave portion 124b provided on the rear side plate portion 122. The first fitting convex portion 124a of the front side plate portion 121 of the second link side plate 120 fits to a first fitting concave portion 124b' of a rear side plate portion 122' of the preceding second link side plate 120'.

Similarly, the second connecting structure N2 includes a second fitting concave portion 124d provided on the front side plate portion 121 and a second fitting convex portion 124c provided on the rear side plate portion 122. The second fitting concave portion 124d of the front side plate portion 121 of the second link side plate 120 fits to a second fitting convex portion 124c' of the rear side plate portion 122' of the preceding second link side plate 120'.

Furthermore, the third connecting structure N3 includes a third fitting concave portion 124f provided on the front side plate portion 121 and formed into a shape that is capable of catching a nail, and a third fitting convex portion 124e provided on the rear side plate portion 122 and formed into a shape of a nail. The third fitting concave portion 124f of the front side plate portion 121 of the second link side plate 120 fits to a third fitting convex portion 124e' of the rear side plate portion 122' of the preceding second link side plate 120' such that the third fitting concave portion 124f catches the nail-shaped third fitting convex portion 124e'.

In this way, a plurality of the second link side plates 120 are consecutively connected in the cable longitudinal direction.

The second link side plate 120 also includes a linear position holding structure N4 for holding the cable protection and guide device 100 in the linear position, and a flexional position restricting structure N5 for restricting the flexional position of the cable protection and guide device 100 at a maximum flexional position.

The maximum flexional position is a position in which the cable protection and guide device 100 is flexed with reference to the linkage portion 123 and with a radius of a flexion radius R shown in FIGS. 5 to 7.

The linear position holding structure N4 includes first to sixth linear position holding surfaces 125a to 125f. The first linear position holding surface 125a, the second linear position holding surface 125b, the third linear position holding surface 125c, and the fourth linear position holding surface 125d are provided on the rear side plate portion 122, and the fifth linear position holding surface 125e and the sixth linear position holding surface 125f are provided on the front side plate portion 121.

In the linear position, the sixth linear position holding surface 125f of the front side plate portion 121 of the link side plate 120 is in surface contact with a fifth linear position holding surface 125e' of a front side plate portion 121' of the preceding second link side plate 120'. In the linear position, the second linear position holding surface 125b of the rear side plate portion 122 of the second link side plate 120 is in surface contact with a first linear position holding surface 125a' of the rear side plate portion 122' of the preceding second link side plate 120'. In the linear position, the fourth linear position holding surface 125d of the rear side plate portion 122 of the second link side plate 120 is in surface contact with a third linear position holding surface 125c' of the rear side plate portion 122' of the preceding second link side plate 120'.

This configuration enables holding and maintaining the linear position of the cable protection and guide device 100.

Also, in the present embodiment, the first linear position holding surface 125a of the rear side plate portion 122 of the link side plate 120 is provided at a rear side of the rear side plate portion 122 in the cable longitudinal direction and includes two faces, i.e., a first face 125aa and a second face 125ab, whose attitudes are mutually different when viewed from the lateral direction to form a convex shape. The second linear position holding surface 125b of the rear side plate portion 122 of the second link side plate 120 is provided at a front side of the rear side plate portion 122 in the cable longitudinal direction and includes two faces, i.e., a first face 125ba and a second face 125bb, whose attitudes are mutually different when viewed from the lateral direction to from a concave shape.

In the linear position, the first linear position holding surface 125a of the rear side plate portion 122 of the second link side plate 120 is in surface contact with a second linear position holding surface 125b" of a rear side plate portion 122" of the succeeding second link side plate 120" at each of the first faces 125aa and 125ba" and the second faces 125ab and 125bb" (see FIG. 5).

With this configuration, when the device 100 moves from the flexional position to the linear position and one link frame body and another adjacent link frame body are slightly twisted with respect to each other by external force, one of the two faces of the first linear position holding surface 125a and a corresponding one of the two faces of the second linear position holding surface 125b" come in contact with each other obliquely with respect to a perpendicular direction thereof and guide the link frame bodies toward a direction in which a top edge Q1 of the convex shape and a bottom edge Q2 of the concave shape are eventually aligned with each other.

During this process, the two faces come in contact sequentially with the corresponding two faces, one after another. Thus, the impact force is dispersed with respect to time.

Also, in the linear position the convex shape formed with the first face 125aa and the second face 125ab and the concave shape formed with the first face 125ba" and the second face 125bb" are in close contact with each other to generate a so-called wedge effect.

Also, when the device 100 moves from the flexional position to the linear position, a load that acts on contact portions is dispersed into the first faces 125aa and 125ba" and the second faces 125ab and 125bb," that are in mutually different positions, as a normal force.

Furthermore, when the device 100 moves from the flexional position to the linear position, at least one of the two faces comes in contact with corresponding one of the two faces obliquely with respect to a circumferential direction of a virtual central axis P of the flexion of the device 100 to mitigate impact force.

The flexional position restricting structure N5 includes first to sixth linear position holding surfaces 126a, 126b, 126e, 126f, 126c and 126d. The first flexional position restricting surface 126a, the second flexional position restricting surface 126b, the fifth flexional position restricting surface 126c, and the sixth flexional position restricting surface 126d are provided on the front side plate portion 121, and the third flexional position restricting surface 126e and the fourth flexional position restricting surface 126f are provided on the rear side plate portion 122.

In the maximum flexional position, the second flexional position restricting surface 126b of the front side plate portion 121 of the link side plate 120 is in surface contact with a first flexional position restricting surface 126a' of the front side plate portion 121' of the preceding second link side plate 120', the sixth flexional position restricting surface 126d of the front side plate portion 121 of the second link side plate 120 is in surface contact with a fifth flexional position restricting surface 125c' of the front side plate portion 121' of the preceding second link side plate 120', and, the fourth flexional position restricting surface 126f of the rear side plate portion 122 of the second link side plate 120 is in surface contact with a third flexional position restricting surface 126e' of the rear side plate portion 122' of the preceding second link side plate 120'.

This arrangement enables restriction of the flexional position of the cable protection and guide device 100.

Also, in the present embodiment, the first flexional position restricting surface 126a of the front side plate portion 121 of the link side plate 120 is provided at a rear side of the front side plate portion 121 in the cable longitudinal direction and includes a first face 126aa and a second face 126ab whose attitudes are mutually different with respect to the lateral direction to form a concave shape. The second flexional position restricting surface 126b of the front side plate portion 121 of the second link side plate 120 is provided at a front side of the front side plate portion 121 in the cable longitudinal direction and includes a first face 126ba and a second face 126bb whose attitudes are mutually different with respect to the lateral direction to from a convex shape.

In the flexional position, the first flexional position restricting surface 126a of the front side plate portion 121 of the second link side plate 120 is in surface contact with a second flexional position restricting surface 126b" of a front side plate portion 121" of the succeeding second link side plate 120" at each of the first faces 126aa and 126ba" and the second faces 126ab and 126bb".

With this configuration, when the device 100 moves from the linear position to the flexional position, as described later in detail, and one link frame body and another adjacent link frame body are slightly twisted with respect to each other by external force, one of the two faces of the first flexional position restricting surface 126a and corresponding one of the two faces of the second flexional position restricting surface 126b" come in contact with each other obliquely with respect to a perpendicular direction thereof and guide the link frame bodies toward a direction in which a top edge Q3 of the convex shape and a bottom edge Q4 of the concave shape are eventually aligned with each other.

During this process, the two faces come in contact with the corresponding two faces one after another to disperse, timewise, impact forces.

Also, under the flexional position the convex shape formed with the first face 126aa and the second face 126ab and the convex shape composed of the first face 126ba" and the second face 126bb" are in close contact with each other to generate a so-called wedge effect.

Also, when the device 100 moves from the linear position to the flexional position, a load that acts on the contact portions is dispersed into the first faces 126aa and 126ba" and the second faces 126ab and 126bb" that are in mutually different positions as normal force.

Furthermore, when the device 100 moves from the linear position to the flexional position, at least one of the two faces comes in contact with a corresponding one of two faces obliquely with respect to a circumferential direction of the virtual central axis P of the flexion of the device 100 to mitigate impact force.

Also, an angle β between the first face 126aa and the second face 126ab of the first flexional position restricting surface 126a and between the first face 126ba" and the second face 126bb" of the second flexional position restricting surface 126b" is smaller than an angle α between the first face 125aa and the second face 125ab of the first linear position holding surface 125a and between the first face 125ba" and the second face 125bb" of the second linear position holding surface 125b".

By decreasing the angle β between the first face 126aa and the second face 126ab of the first flexional position restricting surface 126a and between the first face 126ba" and the second face 126bb" of the second flexional position restricting surface 126b" at the flexional inner circumferential side, a guide effect is created when the device 100 moves to the flexional position to guide the link frame bodies toward a direction in which the top edge Q3 of the convex shape and the bottom edge Q4 of the concave shape are eventually aligned with each other and the wedge effect that is created when the device is in the flexional position are both increased.

This is effective when a larger external force acts on the device 100 and causes the link frame bodies to be mutually twisted when the device 100 moves to the flexional position as compared to the case when the device 100 moves to the linear position.

On the other hand, by increasing the angle α between the first face 125aa and the second face 125ab of the first linear position holding surface 125a and between the first face 125ba" and the second face 125bb" of the second linear position holding surface 125b" at the flexional outer circumferential side, the first faces 125aa and 125ba" and the second faces 125ab and 125bb" respectively come in contact with each other in a slightly inclined direction with respect to a perpendicular line of each face to make it easier to accurately define relative positions of the link frame bodies of the device 100 in the linear position.

Also, the convex shape formed with the first face 126aa and the second face 126ab of the first flexional position restricting surface 126a and the convex shape formed with the first face 126ba" and the second face 126bb" of the second flexional position restricting surface 126b" are provided in a circumferential direction with respect to the virtual center axis P of the device 100 in the flexional position.

With this configuration, the guide effect toward a direction in which the top edge Q3 of the convex shape and the bottom edge Q4 of the concave shape are eventually aligned with each other occurs more reliably when the device 100 moves to the flexional position, and the wedge effect occurs more reliably when the device 100 is in the flexional position.

Also, the linkage portion 123 includes a central flexible area 123a in a thin plate shape extending in the cable longitudinal direction, and base end continuous areas 123b and 123b extending from the central flexible area 123a to the front side plate portion 121 and the rear side plate portion 122, respectively, so that the thickness of the thin plate shape gradually increases.

Furthermore, the rear side plate portion 122 includes the third flexional position restricting surface 126e and the fourth flexional position restricting surface 126f respectively provided at the rear and front side thereof in the cable longitudinal direction, each of the third flexional position restricting surface 126e and the fourth flexional position restricting surface 126f has a face which is in parallel with the lateral direction.

In the flexional position, the third flexional position restricting surface 126e of the rear side plate portion 122 of the second link side plate 120 is in surface contact with a fourth flexional position restricting surface 126f" of the rear side plate portion 122" of the succeeding second link side plate 120".

With this configuration, the flexional position is restricted at both the flectional inner circumferential side and the flexional outer circumferential side, and when the device moves from the linear position to the flexional position, a load is also dispersed into contact portions of the third flexional position restricting surfaces 126e and the fourth flexional position restricting surfaces 126f" at the flexional outer circumferential side.

Effects of the present invention will now be described in detail by using FIGS. 5 to 7 in accordance with actions of the cable protection and guide device 100 when moving from the linear position to the maximum flexional position.

As shown in FIG. 5, when the cable protection and guide device 100 is in the linear position, each flexional outer circumferential side surface of the rear side plate portion 122 of the second link side plate 120 is in contact with the support surface 151 of the support 150.

In this state, the first linear position holding surface 125a of the rear side plate portion 122 of the second link side plate 120 is in surface contact with the second linear position holding surface 125b" of the rear side plate portion 122" of the succeeding second link side plate 120" at each of the two faces, i.e., the first faces 125aa and 125ba" and the second faces 125ab and 125bb".

As shown in FIG. 6, as the cable movable end E1 (see FIG. 1) moves from the state shown in FIG. 5, the cable protection and guide device 100 gradually takes the flexional position from a front side thereof in the cable longitudinal direction.

Specifically, by way of flexion of a linkage portion 123" of the succeeding second link side plate 120" connected to the second link side plate 120, the first linear position holding surface 125a of the rear side plate portion 122 of the second link side plate 120 moves away from the second linear position holding surface 125b" of the rear side plate portion 122" of the succeeding second link side plate 120" and the first flexional position restricting surface 126a" of the front side plate portion 121" of the succeeding second link side plate 120" comes closer to a second flexional position restricting surface (126b) of a front side plate portion (121) of another succeeding second link side plate (120).

In this description, the another succeeding second link side plate of the succeeding second link side plate 120" (that is, a second link side plate connected to the succeeding second link side plate 120" at a rear side of the succeeding second link side plate 120" in the cable longitudinal direction) will be identified as (120).

Similarly, parentheses "( )" will be used for reference numerals that identify elements of another succeeding second link side plate (120). Also, specific illustration will be avoided for elements of the another succeeding second link side plate (120) when the elements can be perceived from the illustration of corresponding elements of the second link side plate 120.

As shown in FIG. 7, as the cable movable end E1 further moves from the state shown in FIG. 6, the cable protection and guide device 100 will be further flexed at the front side thereof in the cable longitudinal direction.

Specifically, by way of further flexion of the linkage portion 123" of the succeeding second link side plate 120" connected to the second link side plate 120, the first linear position holding surface 125a of the rear side plate portion 122 of the second link side plate 120 moves further away from the second linear position holding surface 125b" of the rear side plate portion 122" of the succeeding second link side plate 120" and the first flexional position restricting surface 126a" of the front side plate portion 121" of the succeeding second link side plate 120" comes in contact with the second flexional position restricting surface (126b) of the front side plate portion (121) of the another succeeding second link side plate (120).

At this point, the first flexional position restricting surface 126a" of the front side plate portion 121" of the succeeding second link side plate 120" is configured so as to be in surface contact with the second flexional position restricting surface (126b) of the front side plate portion (121) of the another succeeding second link side plate (120) at each of the first faces 126aa" and (126ba) and the second faces 126ab" and (126bb). Thus, when the device 100 moves from the linear position to the flexional position and one link frame body and another adjacent link frame body are slightly twisted with respect to each other by external force, one of the two faces of the first flexional position restricting surface 126a" and a corresponding one of the two faces of the second flexional position restricting surface (126b) come in contact with each other obliquely with respect to a perpendicular direction thereof and guide the link frame bodies toward a direction in which the top edge Q3 of the convex shape and the bottom edge Q4 of the concave shape are eventually aligned with each other.

During this process, the two faces come in sequential contact with the corresponding two faces, one after another, to disperse impact forces time-wise.

Also, under the flexional position the convex shape formed with the first face 126aa" and the second face 126ab" and the concave shape formed with the first face (126ba) and the second face (126bb) are in close contact with each other to generate so-called wedge effect.

Also, when the device 100 moves from the linear position to the flexional position, a load that acts on contact portions is dispersed into the first faces 126aa" and (126ba) and the second faces 126ab" and (126bb) that are in mutually different positions as normal force.

Furthermore, when the device 100 moves from the linear position to the flexional position, at least one of the two faces comes in contact with a corresponding one of the two faces obliquely with respect to a circumferential direction of the virtual central axis P of the flexion of the device 100 to mitigate impact force.

Also, because the angle β between the first face 126aa and the second face 126ab of the first flexional position restricting surface 126a and between the first face 126ba" and the second face 126bb" of the second flexional position restricting surface 126b" is smaller than the angle α between the first face 125aa and the second face 125ab of the first linear position holding surface 125a and between the first face 125ba" and the second face 125bb" of the second linear position holding surface 125b", the guide effect toward a direction in which the top edge Q3 of the convex shape of the first flexional position restricting surface 126a and the bottom edge Q4 of the concave shape of the second flexional position restricting surface 126b" are eventually aligned with each other and the wedge effect are both increased.

Also, because the convex shape formed with the first face 126aa and the second face 126ab of the first flexional position restricting surface 126a and the convex shape formed with the first face 126ba" and the second face 126bb" of the second flexional position restricting surface 126b" are provided in a circumferential direction with respect to the virtual center axis P of the device 100 in the flexional position, the guide effect toward a direction in which the top edge of Q3 the convex shape and the bottom edge Q4 of the concave shape are eventually aligned with each other occurs more reliably when the device 100 moves to the flexional position, and the wedge effect occurs more reliably when the device 100 is in the flexional position.

The rear side plate portion 122 includes the third flexional position restricting surface 126e and the fourth flexional position restricting surface 126f respectively provided at the rear and front side thereof in the cable longitudinal direction. Each of the third flexional position restricting surface 126e and the fourth flexional position restricting surface 126f has a face which is in parallel with the lateral direction. The third flexional position restricting surface 126a of the rear side plate portion 122 of the second link side plate 120 is in surface contact with the fourth flexional position restricting surface 126f" of the rear side plate portion 122" of the succeeding link side plate 120" when the device 100 is in the flexional position. As such, the flexional position is restricted at both the flectional inner circumferential side and the flexional outer circumferential side.

When the device 100 moves from the linear position to the flexional position a load is also dispersed into contact portions of the third flectional position restricting surface 126e and the fourth flexional position restricting surface the 126f" at the flexional outer circumferential side.

When the cable protection and guide device 100 moves back from the flexional position shown in FIG. 7 to the linear position shown in FIG. 5, the flexed linkage portion 123" of the succeeding second link side plate 120" reverts to an original state thereof. Additionally, the first linear position holding surface 125a of the rear side plate portion 122 of the second link side plate 120 rotationally moves about a substantial center of the linkage portion 123" of the succeeding second link side plate 120" and comes in surface contact with the second linear position holding surface 125b" of the rear side plate portion 122" of the succeeding second link side plate 120" at the first faces 125aa and 125ba" and the second faces 125ab and 125bb".

When the device 100 moves from the flexional position to the linear position and one link frame body and another adjacent link frame body are slightly twisted with respect to each other by external force, one of the two faces of the first linear position holding surface 126a and corresponding one of the two faces of the second linear position holding surface 126b" come in contact with each other obliquely with respect to a perpendicular direction thereof and guide the link frame bodies toward a direction in which the top edge Q1 of the convex shape and the bottom edge Q2 of the concave shape are eventually aligned with each other.

During this process, the two faces come in sequential contact with the corresponding two faces, one after another, to disperse impact forces time-wise.

Also, under the linear position the convex shape formed with the first face 125*aa* and the second face 125*ab* and the convex shape formed with the first face 125*ba*" and the second face 125*bb*" are in close contact with each other to generate the so-called wedge effect.

Also, when the device 100 moves from the flexional position to the linear position, a load that acts on the contact portions is dispersed into the first faces 125*aa* and 125*ba*" and the second faces 125*ab* and 125*bb*" that are in mutually different positions as a normal force.

Also, when the device 100 moves from the flexional position to the linear position, at least one of the two faces comes in contact with a corresponding one of the two faces obliquely with respect to a circumferential direction of the virtual central axis P of the flexion of the device 100 to mitigate impact force.

Furthermore, by increasing the angle α between the first face 125*aa* and the second face 125*ab* of the first linear position holding surface 125*a* and between the first face 125*ba*" and the second face 125*bb*" of the second linear position holding surface 125*b*" at the flexional outer circumferential side, the first faces 125*aa* and 125*ba*" and the second faces 125*ab* and 125*bb*" respectively come in contact with each other in a slightly inclined direction with respect to a perpendicular line of each face to make it easier to accurately define relative positions of the link frame bodies of the device 100 in the linear position.

Each second link side plate 120 (first link side plate) includes the front side plate portion 121 connected to the preceding second link side plate 120' (first link side plate) in the cable longitudinal direction to form the cable flexional inner circumferential side. Each second link side plate 120 includes the rear side plate portion 122 is connected to the succeeding second link side plate 120" (first link side plate) in the cable longitudinal direction to form the cable flexional outer circumferential side. Each second link side plate 120 includes the linkage portion 123 being flexible and interposed between the front side plate portion 121 and the rear side plate portion 122. Each rear side plate portion 122 includes the first linear position holding surface 125*a* and the second linear position holding surface 125*b* respectively provided at rear and front sides thereof in the cable longitudinal direction. The first linear position holding surface 125*a* has the first face 125*aa* and the second face 125*ab* whose attitudes are mutually different with respect to the lateral direction to form one of convex and concave shapes (or a convex shape in the present embodiment). The second linear position holding surface 125*b* has the first face 125*ba* and the second face 125*bb* whose attitudes are mutually different with respect to the lateral direction to form the other of the convex and concave shapes (or a concave shape in the present embodiment). The first linear position holding surface 125*a* of the rear side plate portion 122 of the second link side plate 120 (first link side plate) is in surface contact with the second linear position holding surface 125*b* of the rear side plate portion 122 of the succeeding link plate 120" (first link side plate) at each of the first faces 125*aa* and 125*ba*" and the second faces 125*ab* and 125*bb*" when the device is in the linear position. As such, the relatively twisted positional relationship of the link frame bodies in the linear position may be corrected. As such, it is possible to precisely place the link frame bodies at appropriate positions, to increase the integrity of link frame bodies in the linear position to prevent twisting of the link frame bodies, to decrease the deformation of the second link side plate 120 (first link side plate) and increase the strength (durability) of the second link side plate 120 (first link side plate) against crushing, and to reduce abrasion (wear) of the first linear position holding surface 125*a* and the second linear position holding surface 125*b*" in comparison with a surface structure having only one surface. Further, it is possible to mitigate impact noise.

The front side plate portion 121 includes the first flexional position restricting surface 126*a* and the second flexional position restricting surface 126*b* respectively provided at rear and front sides thereof in the cable longitudinal direction. The first flexional position restricting surface 126*a* has the first face 126*aa* and the second face 126*ab* whose attitudes are mutually different with respect to the lateral direction to form one of convex and concave shapes (or a convex shape in the present embodiment). The second flexional position restricting surface 126*b* has the first face 126*ba* and the second face 126*bb* whose attitudes are mutually different with respect to the lateral direction to form the other of the convex and concave shapes (or a concave shape in the present embodiment). The first flexional position restricting surface 126*a* of the front side plate portion 121 of the second link side plate 120 (first link side plate) is in surface contact with the second flexional position restricting surface 126*b*" of the front side plate portion 121" of the succeeding link plate 120" (first link side plate) at each of the first faces 126*aa* and 126*ba*" and the second faces 126*ab* and 126*bb*" when the device is in the flexional position. As such, it is possible to correct relatively twisted positional relationship of the link frame bodies in the flexional position and precisely place the link frame bodies at appropriate positions, to increase the integrity of link frame bodies in the flexional position to prevent twisting of the link frame bodies, to decrease the deformation of the second link side plate 120 (first link side plate) and increase the strength (durability) of the second link side plate 120 (first link side plate) against crushing, and to reduce abrasion (wear) of the first flexional position restricting surface 126*a* and the second flexional position restricting surface 126*b*" in comparison with a surface structure having only one surface. Further, it is possible to mitigate impact noise.

The angle β between the first face 126*aa* and the second face 126*ab* of the first flexional position restricting surface 126*a* and between the first face 126*ba*" and the second face 126*bb*" of the second flexional position restricting surface 126*b*" is smaller than the angle α between the first face 125*aa* and the second face 125*ab* of the first linear position holding surface 125*a* and between the first face 125*ba*" and the second face 125 125*bb*" of the second linear position holding surface 125*b*". Thus, it is possible to enhance the accuracy of the positional relationship between the link frame bodies and increase the integrity of the link frame bodies to prevent twisting of the device particularly in the flexional position, and to enhance the accuracy of the linear position.

The convex and concave shapes formed with the first faces 126*aa* and 126*ba*" and the second faces 126*ab* and 126*bb*" of the first flexional position restricting surface 126*a* and the second flexional position restricting surface 126*b*" are provided in a circumferential direction with respect to the virtual center axis P of the device 100 in the flexional position. Thus, it is possible to increase the accuracy of the positional relationship of link frame bodies in the flexional position to reliably prevent twisting of the link frame bodies, and to increase the integrity of link frame bodies in the flexional position to reliably prevent twisting of the link frame bodies.

The linkage portion 123 includes the central flexible area 123a in a thin plate shape extending in the cable longitudinal direction, and the base end continuous areas 123b and 123b extending from the central flexible area 123a to the front side plate portion 121 and the rear side plate portion 122, respectively. The thickness of the thin plate shape gradually increases, and the rear side plate portion 122 includes the third flexional position restricting surface 126e and the fourth flexional position restricting surface 126f respectively provided at the rear and front side thereof in the cable longitudinal direction. Each of the third flexional position restricting surface 126e and the fourth flexional position restricting surface 126f has a face which is in parallel with the lateral direction, the third flexional position restricting surface 126e of the rear side plate portion 122 of the second link side plate 120 is in surface contact with the fourth flexional position restricting surface 126f' of the rear side plate portion 122" of the succeeding link side plate 120" when the device 100 is in the flexional position. Thus, it is possible to accurately define the flexional position by using the linkage portion which does not have a rotating shaft or a hinge structure, and to reduce the load acting on a plate structure of the linkage portion.

What is claimed is:

1. A cable protection and guide device having a number of link frame bodies connected to each other in a cable longitudinal direction between a cable movable end and a cable fixed end, comprising:
   each of said link frame bodies includes an interior, said cable residing in said interior of said number of number of link frame bodies;
   each of said link frame bodies taking a linear position in which said device is in contact with a support surface of a support and a flexional position in which said device is spaced from the support surface;
   each of said link frame bodies includes: a pair of laterally spaced apart link side plates;
   said link side plates form a flexional circumferential bend having a flexional inner circumferential side and a flexional outer circumferential side; each of said spaced apart link side plates integrally includes: a front side plate portion connected to a preceding link side plate in said cable longitudinal direction to form a flexional inner circumferential side, a rear side plate portion connected to a succeeding link side plate in said cable longitudinal direction to form a flexional outer circumferential side, and, a flexible linkage portion interposed between said front side plate portion and said rear side plate portion;
   a flexional outer circumferential side connecting arm bridging over said flexional outer circumferential side of said link side plates;
   a flexional inner circumferential side connecting arm bridging over said flexional inner circumferential side of said link side plates; and,
   said rear side plate portion comprises a first linear position holding surface and a second linear position holding surface, respectively, provided at rear and front sides thereof in said cable longitudinal direction, said first linear position holding surface has two faces whose attitudes are mutually different with respect to said lateral direction to form one of convex and concave shapes, said second linear position holding surface has two faces whose attitudes are mutually different with respect to said lateral direction to form the other of said convex and concave shapes, said first linear position holding surface of said rear side plate portion of one link side plate being in surface contact with said second linear position holding surface of said rear side plate portion of said succeeding link plate at each of said two faces when said device is in said linear position.

2. The cable protection and guide device according to claim 1, wherein:
   said front side plate portion comprises:
   a first flexional position restricting surface and a second flexional position restricting surface, respectively, provided at rear and front sides thereof in said cable longitudinal direction, said first flexional position restricting surface has two faces whose attitudes are mutually different with respect to said lateral direction to form one of convex and concave shapes, a second flexional position restricting surface has two faces whose attitudes are mutually different with respect to said lateral direction to form the other of said convex and concave shapes, said first flexional position restricting surface of said front side plate portion of one link side plate in surface contact with said second flexional position restricting surface of said front side plate portion of said succeeding link plate at each of said two faces when said device is in said flexional position.

3. The cable protection and guide device according to claim 2, wherein an angle between said two faces of said first flexional position restricting surface and between said two faces of said second flexional position restricting surface is smaller than an angle between said two faces of said first linear position holding surface and between said two faces of said second linear position holding surface.

4. The cable protection and guide device according to claim 2, wherein said convex and concave shapes formed with said respective two faces of said first flexional position restricting surface and said second flexional position restricting surface are provided in a circumferential direction with respect to a virtual center axis of said device in said flexional position.

5. The cable protection and guide device according to any one of claim 2, wherein said linkage portion comprises: a central flexible area in a thin plate shape extending in said cable longitudinal direction, said thin plate shape has a thickness; and, base end continuous areas extending from said central flexible area to said front side plate portion and said rear side plate portion, respectively, so that said thickness of said thin plate shape gradually increases, and
   said rear side plate portion comprises a third flexional position restricting surface and a fourth flexional position restricting surface, respectively, provided at said rear and front side thereof in said cable longitudinal direction, each of said third flexional position restricting surface and said fourth flexional position restricting surface has a face parallel with said lateral direction, said third flexional position restricting surface of said rear side plate portion of said link side plate being in surface contact with said fourth flexional position restricting surface of said rear side plate portion of said succeeding link side plate when said device is in said flexional position.

* * * * *